United States Patent
Pandey et al.

(10) Patent No.: US 11,310,724 B2
(45) Date of Patent: Apr. 19, 2022

(54) KEY MANAGEMENT FOR FAST TRANSITIONS

(71) Applicant: ARRIS Enterprises LLC, Suwanee, GA (US)

(72) Inventors: Sheetal Pandey, Milpitas, CA (US); Tsung-Kai Chen, New Taipei (TW)

(73) Assignee: ARRIS Enterprises LLC, Suwanee, GA (US)

( * ) Notice: Subject to any disclaimer, the term of this patent is extended or adjusted under 35 U.S.C. 154(b) by 33 days.

(21) Appl. No.: 16/090,583

(22) PCT Filed: Apr. 1, 2016

(86) PCT No.: PCT/US2016/025541
§ 371 (c)(1),
(2) Date: Oct. 1, 2018

(87) PCT Pub. No.: WO2017/171835
PCT Pub. Date: Oct. 5, 2017

(65) Prior Publication Data
US 2021/0076213 A1 Mar. 11, 2021

Related U.S. Application Data

(60) Provisional application No. 62/316,475, filed on Mar. 31, 2016.

(51) Int. Cl.
*H04L 29/06* (2006.01)
*H04W 48/14* (2009.01)
(Continued)

(52) U.S. Cl.
CPC .......... *H04W 48/14* (2013.01); *H04L 9/0833* (2013.01); *H04L 9/0838* (2013.01);
(Continued)

(58) Field of Classification Search
CPC .......... H04W 12/0431; H04W 12/069; H04W 12/041; H04W 84/12; H04W 36/0038;
(Continued)

(56) References Cited

U.S. PATENT DOCUMENTS

| | | | |
|---|---|---|---|
| 2008/0096575 A1* | 4/2008 | Aragon | H04W 36/22 455/453 |
| 2012/0284773 A1* | 11/2012 | Gamer | H04W 12/041 726/3 |
| 2013/0196708 A1* | 8/2013 | Narasimhan | H04W 12/04 455/525 |

* cited by examiner

*Primary Examiner* — Evans Desrosiers
(74) *Attorney, Agent, or Firm* — Steven Stupp; Stewart Wiener

(57) ABSTRACT

When an access point associates with an electronic device, the access point may establish secure communication with the electronic device using a four-way handshake with the electronic device. Next, the access point may distribute secondary pairwise master keys (PMKs) to radio-frequency (RF)-neighbor access points of the access point in a wireless local area network, where the secondary PMKs facilitate fast basic service set (BSS) transitions with the electronic device when a handover occurs without using the four-way handshake to establish secure communication with the electronic device. Furthermore, when the access point receives information that indicates that the electronic device has associated with a second access point in the RF-neighbor access points of the access point, the access point provides instructions to delete the secondary PMKs at the RF-neighbor access points of the access point, and provides additional secondary PMKs to RF-neighbor access points of the second access point.

20 Claims, 13 Drawing Sheets

(51) Int. Cl.
  *H04W 12/041* (2021.01)
  *H04W 12/062* (2021.01)
  *H04W 12/069* (2021.01)
  *H04W 12/0431* (2021.01)
  *H04L 9/08* (2006.01)
  *H04W 36/00* (2009.01)
  *H04W 36/08* (2009.01)
  *H04W 84/12* (2009.01)

(52) U.S. Cl.
  CPC ..... *H04W 12/041* (2021.01); *H04W 12/0431* (2021.01); *H04W 12/062* (2021.01); *H04W 12/069* (2021.01); *H04W 36/0038* (2013.01); *H04W 36/08* (2013.01); *H04L 2209/80* (2013.01); *H04W 84/12* (2013.01)

(58) Field of Classification Search
  CPC .. H04L 9/0833; H04L 9/0838; H04L 2209/80
  USPC ........................................................ 713/171
  See application file for complete search history.

KEY MANAGEMENT FOR FAST TRANSITIONS

CROSS REFERENCE TO RELATED APPLICATIONS

This application claims priority under 35 U.S.C. 371 to International Patent No. PCT/US2016/025541, as filed on Apr. 1, 2016, which claims priority to U.S. Provisional Application Ser. No. 62/316,475, as filed on Mar. 31, 2016, the contents of both which are herein incorporated by reference.

BACKGROUND

Field

The described embodiments relate to techniques for communicating information among electronic devices. In particular, the described embodiments relate to techniques for enabling fast transitions in a wireless local area network (WLAN) based on pre-distributed keys.

Related Art

Many electronic devices are capable of wirelessly communicating with other electronic devices. In particular, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Wash.), and/or another type of wireless network.

For example, many electronic devices communicate with each other via wireless local area networks (WLANs) using an IEEE 802.11-compatible communication protocol (which are sometimes collectively referred to as 'Wi-Fi'). In a typical deployment, a Wi-Fi-based WLAN includes one or more access points (or basic service sets or BSSs) that communicate wirelessly with other electronic devices using Wi-Fi, and that provide access to another network (such as the Internet) via IEEE 802.3 (which is sometimes referred to as 'Ethernet'). Moreover, the effective wireless range of an access point is usually up to a few hundred meters.

One consequence of this wireless-range constraint is that, when an electronic device (such as a user's cellular telephone) is moving, there may need to be handoffs from one access point to another. For example, if a user is in an automotive environment, there may be handoffs every five to ten seconds.

Furthermore, Wi-Fi communication in most WLANs is secure. In particular, the Wi-Fi communication between an electronic device and an access point is usually encrypted using encryption keys that are generated by the electronic device and the access point using a four-way handshake (as specified in the IEEE 802.11i standard). However, the four-way handshake adds an additional time delay when the electronic device is associating with an access point. This time delay may be frustrating to users (especially when there are multiple handoffs), and thus may degrade the user experience when communicating in a WLAN via Wi-Fi.

SUMMARY

The described embodiments relate to an access point that facilitates fast handoffs in a wireless local area network (WLAN) that includes other access points. This access point includes an interface circuit that, during operation, communicates with the other access points and with an electronic device. Moreover, based on the communication with the other access points, the access point may optionally determine and store topography information specifying radio-frequency (RF)-neighbor access points for the access point and the other access points based on the communication between the access point and the other access points. Then, when the access point associates with the electronic device, the access point may be designated as a master access point in the WLAN for the electronic device. Based on a pre-shared key (PSK), the access point may generate a pairwise master key (PMK) associated with the access point and the electronic device.

Furthermore, using a four-way handshake with the electronic device, the access point may calculate a pairwise transient key (PTK) to enable secure communication with the electronic device. Next, the access point may generate and distribute secondary PMKs to RF-neighbor access points of the access point based on the optional topography information, where each of the secondary PMKs are unique and the secondary PMKs facilitate fast basic service set (BSS) transitions with the electronic device when a handover occurs without using the four-way handshake to establish secure communication with the electronic device.

Subsequently, the access point may receive association information from a second access point in the RF-neighbor access points of the access point that indicates that the electronic device has associated with the second access point. In response, the access point may provide instructions to delete the secondary PMKs at the RF-neighbor access points of the access point, and may generate and provide additional secondary PMKs to RF-neighbor access points of the second access point.

Note that the communication between the access point and the other access points may include wired and/or wireless communication.

Moreover, the PSK may include Extensible Authentication Protocol (EAP) parameters, and the access point may obtain the EAP parameters from a server (such as a RADIUS server or a controller), when authenticating the electronic device in the WLAN.

Furthermore, the PMK may be generated using a secure hashing function based on the PSK.

Additionally, the four-way handshake may be compatible with an IEEE 802.11i standard and/or the fast basic service set (BSS) transitions may be compatible with an IEEE 802.11r standard. Note that the RF-neighbor access points of a given access point (which may be one of the other access points or the access point) may be nearest RF neighbors of the given access point.

In some embodiments, when distributing the secondary PMKs, the access point includes information that indicates the access point is the master access point in the WLAN for the electronic device.

Moreover, the access point may perform load balancing in the WLAN. In particular, when there is high loading of the access point (such as when the number of electronic devices associated with the access point exceeds a threshold value) and the loading of the second access point is not high (such as when the number of electronic devices associated with the second access point is less than the threshold value), then after receiving the association information the access point may designate the second access point as the master access point in the WLAN for the electronic device.

Furthermore, when the access point receives a disassociate message from the electronic device or a time-out message from the controller, the access point may delete the PMK and may provide instructions to delete the secondary PMKs at the RF-neighbor access points of the access point.

Additionally, the access point may include: a processor; and a memory, coupled to the processor, which stores a program module that, during operation, is executed by the processor. The program module may include instructions for at least some of the operations performed by the access point.

Another embodiment provides a computer-program product for use with the access point. This computer-program product includes instructions for at least some of the operations performed by the access point.

Another embodiment provides a method. This method includes at least some of the operations performed by the access point.

Another embodiment provides the electronic device that performs counter-part operations to those performed by the access point.

Another embodiment provides a computer-program product for use with the electronic device. This computer-program product includes instructions for at least some of the operations performed by the electronic device.

Another embodiment provides a method. This method includes at least some of the operations performed by the electronic device.

Another embodiment provides the second access point that performs counter-part operations to those performed by the access point.

Another embodiment provides a computer-program product for use with the second access point. This computer-program product includes instructions for at least some of the operations performed by the second access point.

Another embodiment provides a method. This method includes at least some of the operations performed by the second access point.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

When an access point associates with an electronic device, an access point may be designated as a master access point in a wireless local area network (WLAN) for the electronic device. Moreover, the access point may establish secure communication with the electronic device using a four-way handshake with the electronic device. Next, the access point may distribute secondary pairwise master keys (PMKs) to radio-frequency (RF)-neighbor access points of the access point in the WLAN, where the secondary PMKs facilitate fast basic service set (BSS) transitions with the electronic device when a handover occurs without using the four-way handshake to establish secure communication with the electronic device. Furthermore, when the access point receives information that indicates that the electronic device has associated with a second access point in the RF-neighbor access points of the access point, the access point provides instructions to delete the secondary PMKs at the RF-neighbor access points of the access point, and provides additional secondary PMKs to RF-neighbor access points of the second access point.

By facilitating fast BSS transitions, this communication technique may reduce the time delay associated with the four-way handshake when the electronic device is associating with an access point in the WLAN. In turn, this capability may enable use of the WLAN even when there are multiple handoffs from one access point to another, such as when a user is in an automotive environment (e.g., when the user is driving in a car). Consequently, the communication technique may reduce user frustration when communicating in the WLAN, which may improve the user experience when using the electronic device and the access points.

In the discussion that follows, the electronic device and the access points communicate packets in accordance with a communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Wash.), and/or another type of wireless interface. In the discussion that follows, Wi-Fi is used as an illustrative example. However, a wide variety of communication protocols (such as Long Term Evolution or LTE, another cellular-telephone communication protocol, etc.) may be used.

Figure 1:
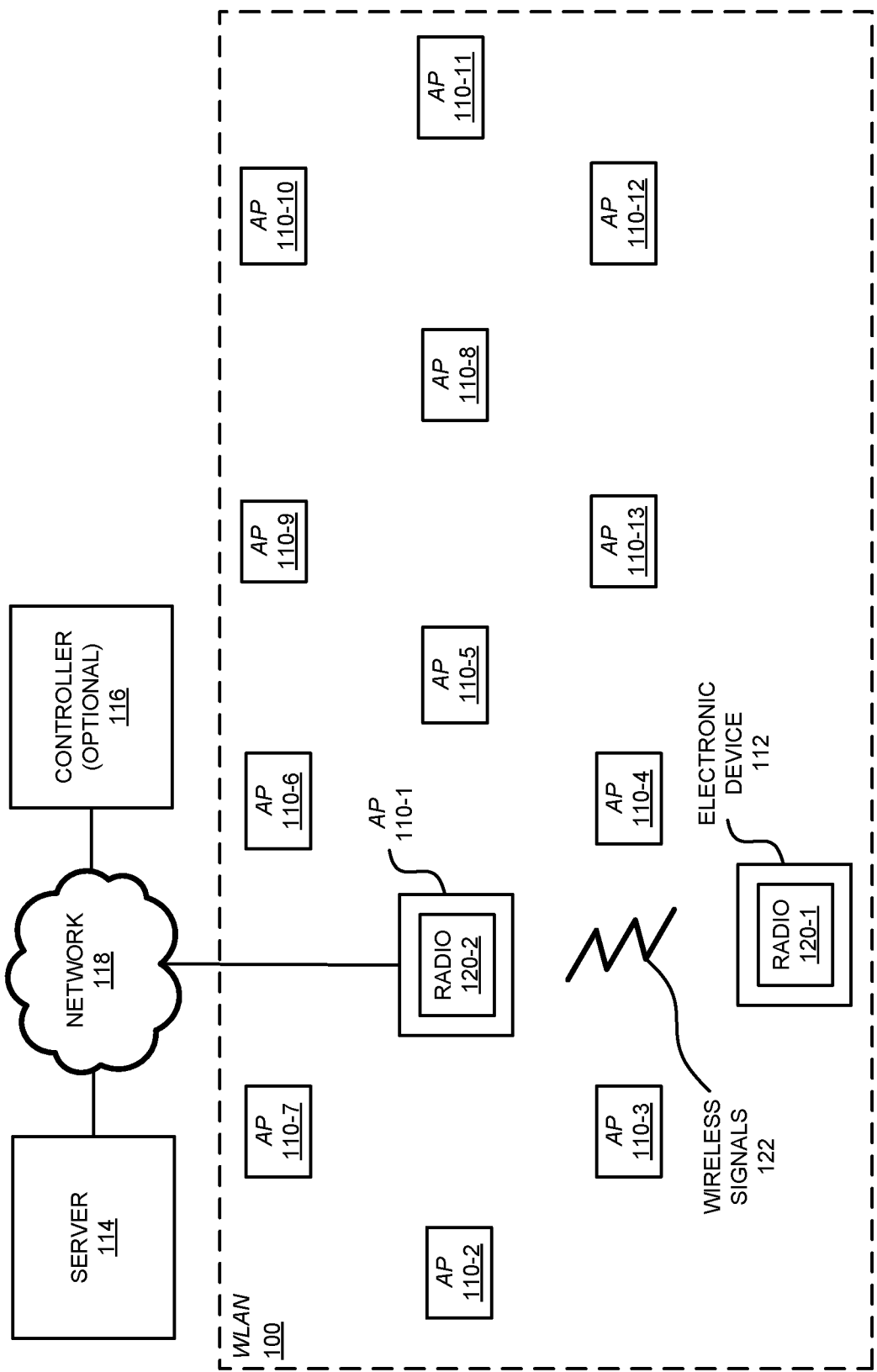
FIG. 1 is a drawing illustrating communication among access points and an electronic device in a wireless local area (WLAN) in accordance with an embodiment of the present disclosure.

FIG. 1 presents a drawing illustrating communication among access points (APs) 110 and an electronic device 112 (such as a cellular telephone) in a WLAN 100 in accordance with some embodiments. In particular, access points 110 may communicate with each other using wireless and/or wired communication, and access points 110 may communicate with server 114 and/or optional controller 116. (However, in some embodiments, optional controller 116 is a virtual controller, such as a controller than is implemented in software in an environment on a server.) In addition, at least some of access points 110 may communicate with electronic device 112 using wireless communication.

The wired communication may occur via network 118 (such as an intra-net and/or the Internet) and may use a wired communication protocol, such as an IEEE 802.3 communication protocol (which, as noted previously, is sometimes referred to as 'Ethernet'). For simplicity in FIG. 1, only a connection or link between access point 110-1 and network 118 is shown. Moreover, the wireless communication using Wi-Fi may involve: transmitting advertising frames on wireless channels, detecting one another by scanning wireless channels, establishing connections (for example, by transmitting association or attach requests), and/or transmitting and receiving packets (which may include the association requests and/or additional information as payloads).

Figure 13:
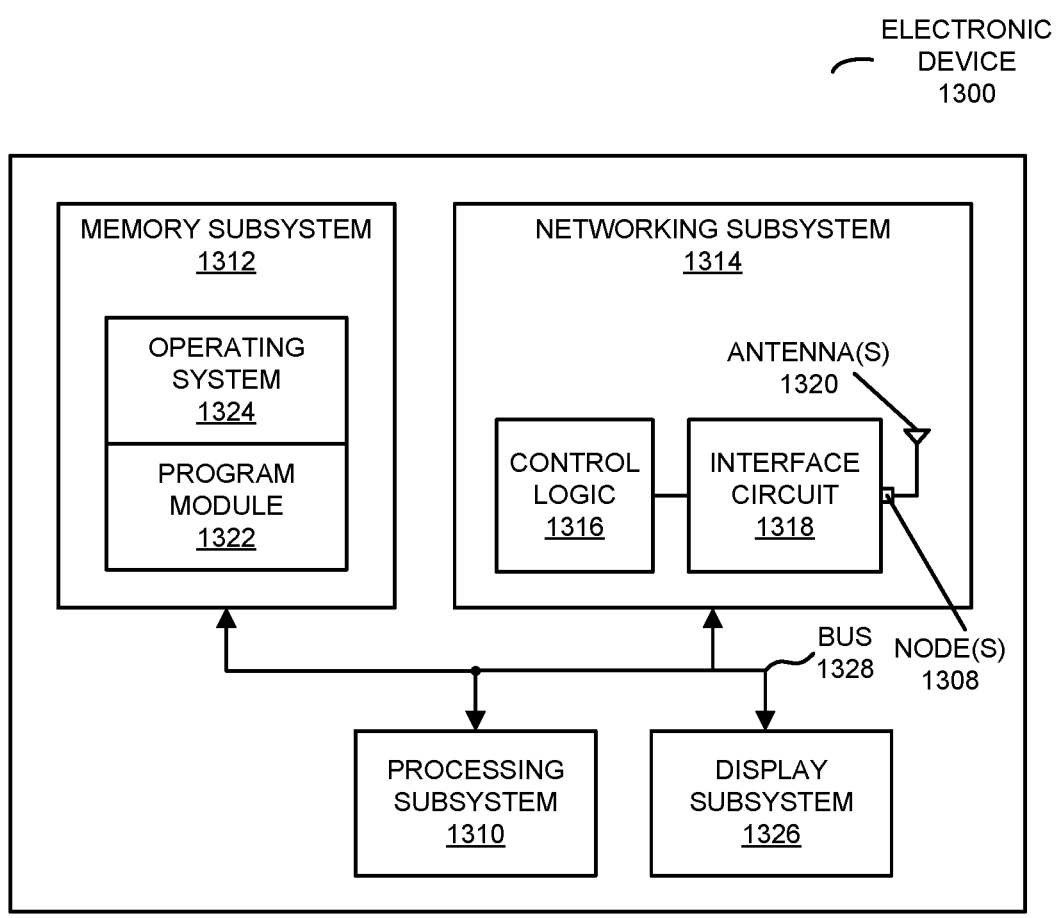
FIG. 13 is a block diagram illustrating an electronic device in accordance with an embodiment of the present disclosure.

As described further below with reference to FIG. 13, access points 110, electronic device 112, server 114 and/or optional controller 116 may include subsystems, such as a networking subsystem, a memory subsystem and a processor subsystem. In addition, access points 110 and electronic device 112 may include radios 120 in the networking subsystems (for simplicity, only radios 120-1 and 120-2 are shown in FIG. 1). More generally, access points 110 and electronic device 112 can include (or can be included within) any electronic devices with the networking subsystems that enable access points 110 and electronic device 112 to wirelessly communicate with each other. This wireless communication can comprise transmitting advertisements on wireless channels to enable access points and/or electronic devices to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 120 are shown in access points 110 and electronic device 112, one or more of these instances may be different from the other instances of radios 120.

As can be seen in FIG. 1, wireless signals 122 (represented by a jagged line) are transmitted from radio 120-1 in electronic device 112. These wireless signals may be received by radio 120-2 in access point 110-1. In particular, electronic device 112 may transmit packets. In turn, these packets may be received by access point 110-1. Moreover, access point 110-1 may allow electronic device 112 to communicate with other electronic devices, computers and/or servers via network 118.

Note that the communication among access points 110 and electronic device 112 may be characterized by a variety of performance metrics, such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments processing a packet or frame in access points 110 and electronic device 112 includes: receiving wireless signals 122 with the packet or frame; decoding/extracting the packet or frame from received wireless signals 122 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

We now further describe communication in WLAN 100. During the communication technique, access point 110-1 may optionally determine and store topography information specifying RF-neighbor access points for access point 110-1 and access points 110-2 through 110-13 in WLAN 100 (which are sometimes referred to as 'other access points') based on the communication between access point 110-1 and these other access points. For example, access point 110-1 may scan the RF environment and may identify the other access points (which may support IEEE 802.11r). Then, access point 110-1 may optionally determine the topography information based on RSSI values (and, more generally, based on one or more communication-performance information or metrics) and/or location information measured by access point 110-1 and/or reported by the other access points. Alternatively or additionally, access point 110-1 may optionally determine the topography information based on information provided by optional controller 116.

Figure 2:
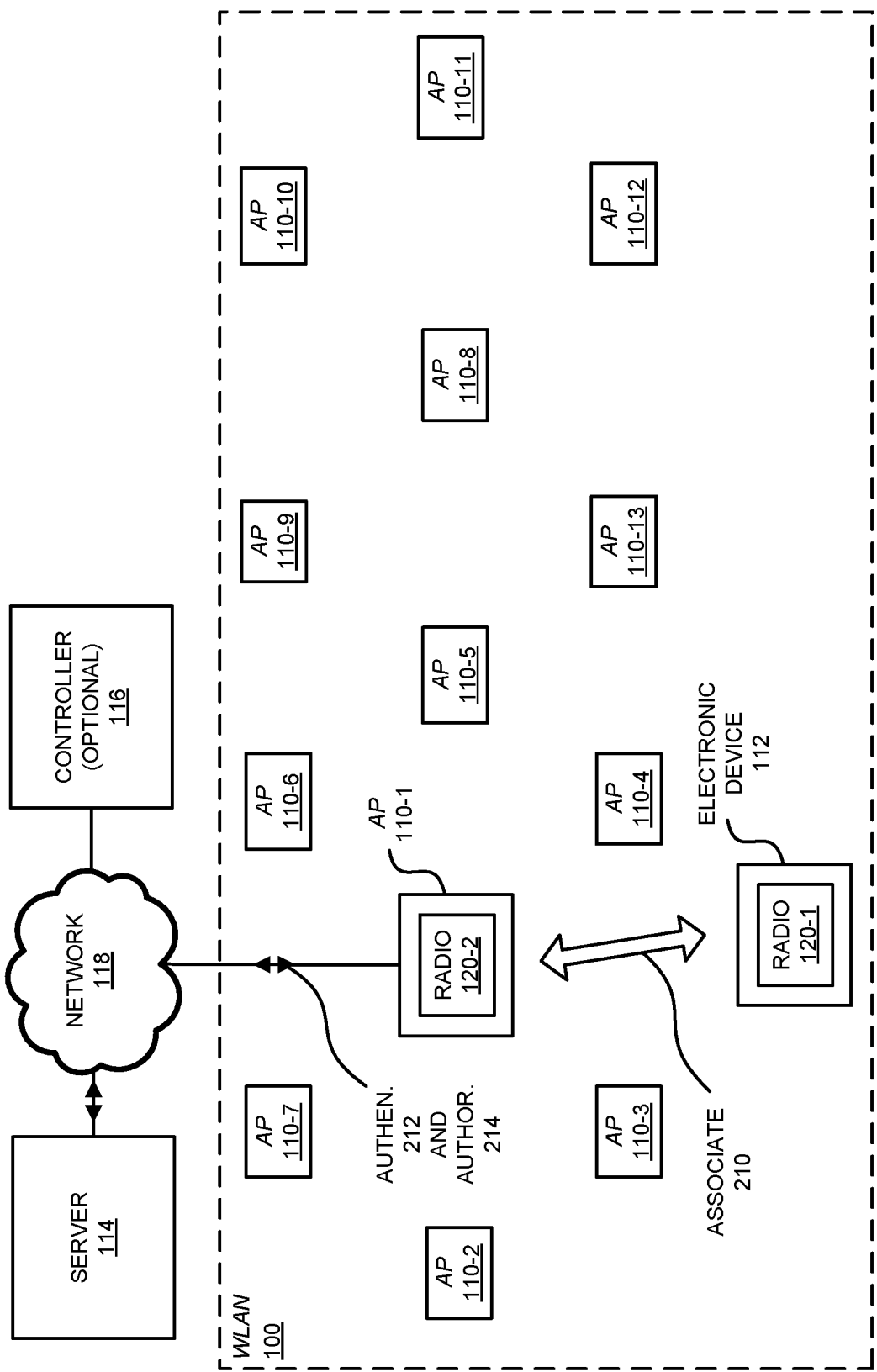
FIG. 2 is a drawing illustrating communication among the access points and the electronic device in the WLAN of FIG. 1 in accordance with an embodiment of the present disclosure.

Then, as shown in FIG. 2, which presents a drawing illustrating communication among access points 110 and electronic device 112 in WLAN 100 in accordance with some embodiments, access point 110-1 may associate 210 with electronic device 112. During the association, access point 110-1 may authenticate 212 electronic device 112 and authorize 214 its access to WLAN 100 with server 114 (such as a RADIUS server) via network 118.

Figure 3:
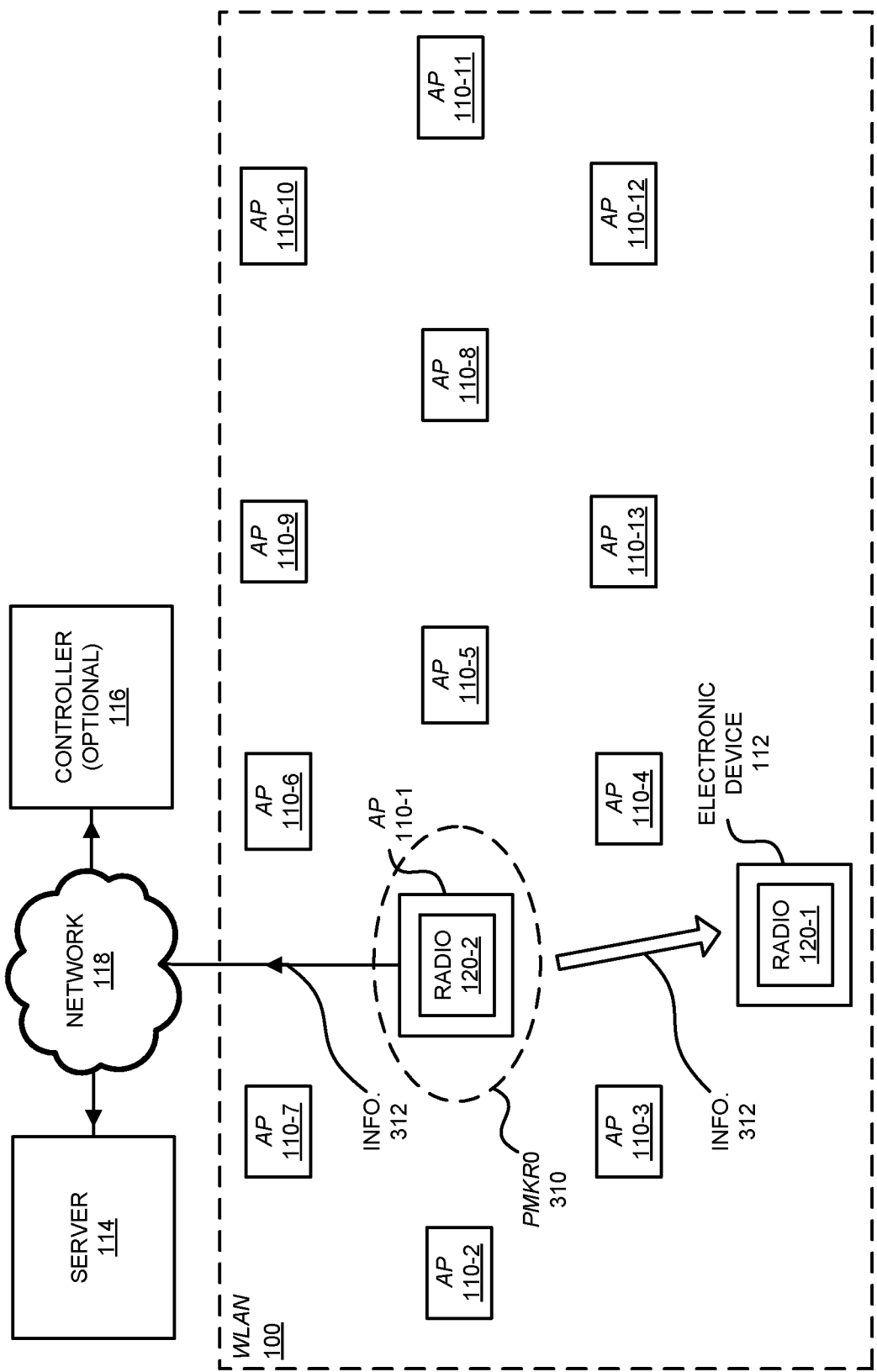
FIG. 3 is a drawing illustrating communication among the access points and the electronic device in the WLAN of FIG. 1 in accordance with an embodiment of the present disclosure.

Moreover, as shown in FIG. 3, which presents a drawing illustrating communication among access points 110 and electronic device 112 in WLAN 100 in accordance with some embodiments, after establishing a connection with electronic device 112 access point 110-1 may be designated as a master access point in WLAN 100 for electronic device 112 (which is sometimes referred to as 'PMKR0' 310). For example, access point 110-1 may designate itself as the master if none of the other access points is already the master. Alternatively, an optional controller 116 for WLAN 100 may designate access point 110-1 as the master. Information 312 that indicates access point 110-1 is the master may be provided to electronic device 112, server 114 and/or optional controller 116.

Next, in order to exchange data frames between access point 110-1 and electronic device 112, one or more keys in a key hierarchy may be established. In particular, access point 110-1 may request a pre-shared key (PSK) or a master session key (MSK) (and, more generally, a shared secret) from server 114 (or optional controller 116) when authenticating and authorizing electronic device 112. For example, the PSK may include Extensible Authentication Protocol (EAP) parameters that are provided by server 114. Then, access point 110-1 may generates a pairwise master key (PMK) associated with access point 110-1 and electronic device 112 (e.g., the PMK may be uniquely associated with access point 110-1 and electronic device 112). In particular, the PMK may be generated using a secure hashing function based on the PSK, such as HMAC-SHA256.

Furthermore, using a four-way handshake with electronic device 112, access point 110-1 may calculate a pairwise transient key (PTK) to enable secure communication with electronic device 112. In particular, the four-way handshake may be compatible with an IEEE 802.11i standard.

Figure 4:
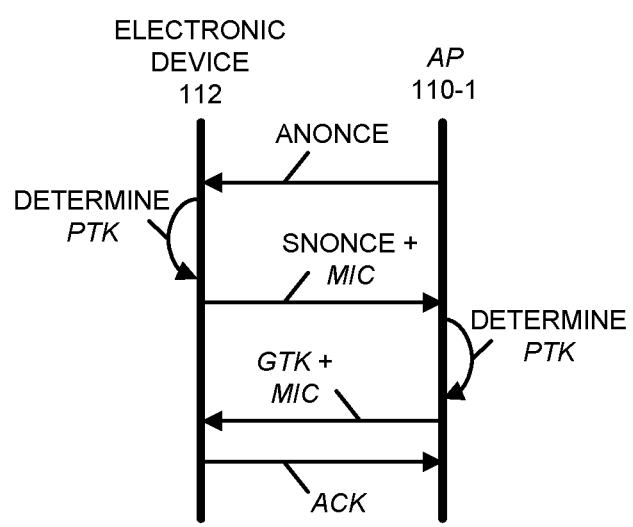
FIG. 4 is a drawing illustrating a four-way handshake between an access point and an electronic device in accordance with an embodiment of the present disclosure.

FIG. 4 presents a drawing illustrating a four-way handshake between access point 110-1 and electronic device 112 in accordance with some embodiments. The four-way handshake may allow access point 110-1 and electronic device 112 to independently prove to each other that they know the PSK/PMK without ever disclosing the key. In particular, instead of disclosing the key, access point 110-1 and electronic device 112 may each encrypt messages to each other. These messages may only be decrypted by using the PMK that they already share. Moreover, if decryption of the messages is successful, this proves knowledge of the PMK. Note that the four-way handshake may protect the PMK from malicious access points (such as an attacker's service set identifier impersonating a real access point) so that electronic device 112 never has provide its PMK to access point 110-1.

The PMK may last for the entire session and may be exposed as little as possible. Consequently, keys to encrypt traffic may need to be derived. In particular, the four-way handshake is used to establish another key called the PTK. In some embodiments, the PTK is generated by concatenating the following attributes: the PMK, a nonce (such as a random or a pseudorandom number) of access point 110-1 (which is sometimes denoted as 'ANonce'), another nonce (such as another random or another pseudorandom number) of electronic device 112 (which is sometimes denoted as 'SNonce'), a media access control (MAC) address of access point 110-1, and a MAC address of electronic device 112. Then, the product is used as an input to a pseudorandom function. Moreover, in some embodiments the four-way handshake also yields a group temporal key (GTK), which is used to decrypt multicast and broadcast traffic.

Note that the messages during the four-way handshake may be sent as EAP over LAN (EAPoL)-key frames. As shown in FIG. 4, access point 110-1 may send a nonce value (ANonce) to electronic device 112. Then, electronic device 112 may have all the attributes it needs to construct the PTK. Moreover, electronic device 112 may sent its own nonce value (SNonce) to access point 110-1 and optionally with a message integrity code (MIC), including authentication, which may be a message authentication and integrity code (MAIC).

Next, access point 110-1 may construct and sends the GTK and a sequence number together with another MIC. This sequence number may be used in the next multicast or broadcast frame, so that the receiving electronic device can perform basic replay detection. Furthermore, electronic device 112 may sends a confirmation to access point 110-1.

In some embodiments, the PTK includes 64 bytes and is divided into five separate keys, including: 16 bytes of a EAPoL-key confirmation key (KCK) that is used to compute the MIC on a Wi-Fi protected access (WPA) EAPoL-key message; 16 bytes of a EAPoL-key encryption key (KEK) that an access point (such as access point 110-1) uses to encrypt additional data sent (in the 'key data' field) to an electronic device (such as electronic device 112); 16 bytes of a temporal key (TK) that is used to encrypt/decrypt unicast data packets; 8 bytes of a Michael MIC authenticator transmit key that is used to compute a MIC on unicast data packets transmitted by an access point; and 8 bytes of a Michael MIC authenticator receive key that is used to compute a MIC on unicast data packets transmitted by an electronic device. Similarly, the GTK may be divided into three separate keys, including: 16 bytes of a group temporal encryption key that is used to encrypt/decrypt multicast and broadcast data packets; 8 bytes of a Michael MIC authenticator transmit key that is used to compute a MIC on multicast and broadcast packets transmitted by an access point; and 8 bytes of a Michael MIC authenticator receive key that may be used if an electronic device sends multicast traffic. Note that the Michael MIC authenticator transmit/receive keys in the PTK and the GTK may be used if the data is encrypted using a temporal key integrity protocol (TKPI).

In some embodiments, the keys determined by access point 110-1 using the four-way handshake are used during fast BSS transfers in accordance with IEEE 802.11r. In particular, access point 110-1 may generate a PMK that is referred to as the PMKR0Name, which may be generated or determined in accordance with IEEE 802.11r.

Figure 5:
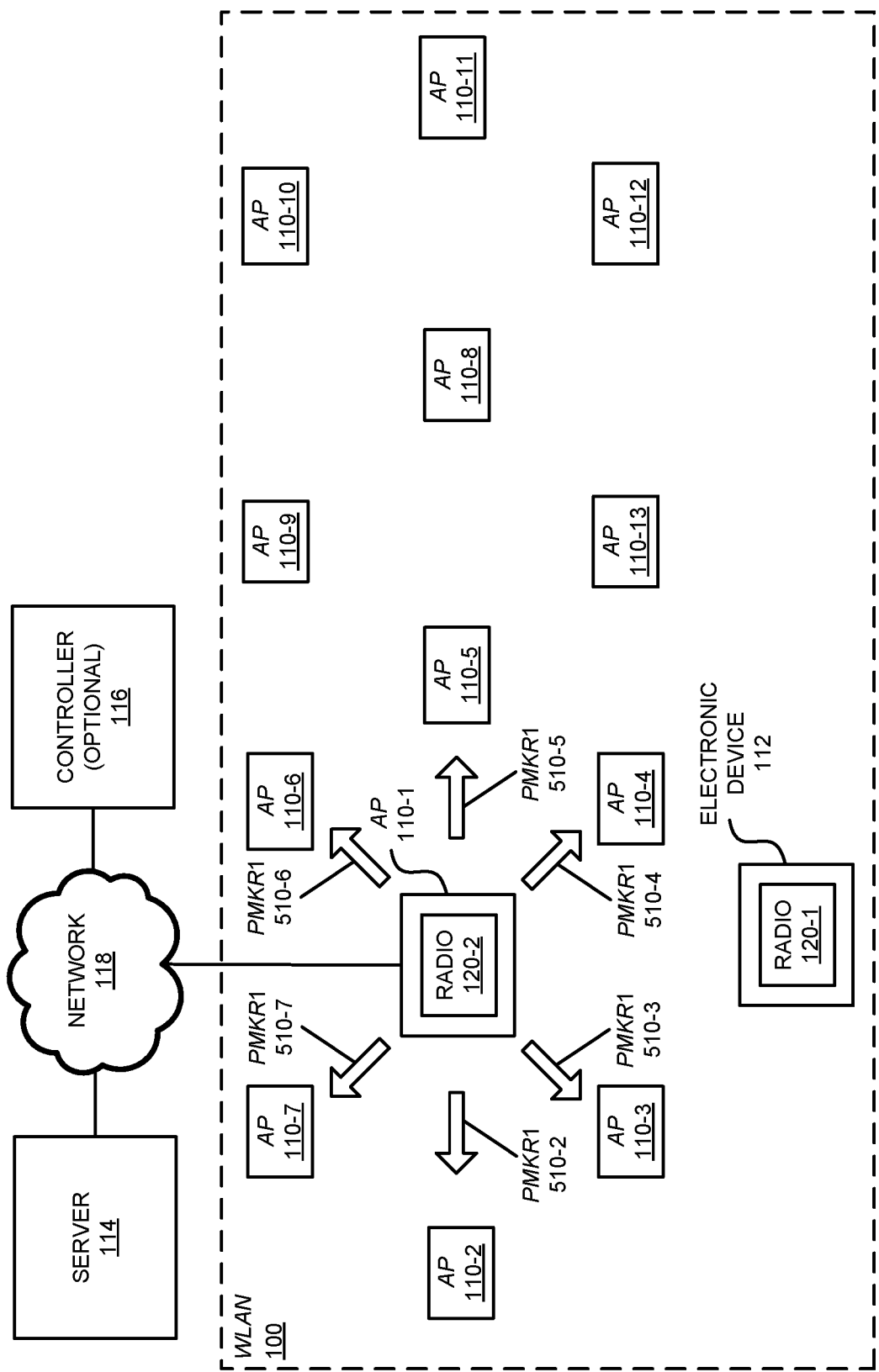
FIG. 5 is a drawing illustrating communication among the access points and the electronic device in the WLAN of FIG. 1 in accordance with an embodiment of the present disclosure.

Next, as shown in FIG. 5, which presents a drawing illustrating communication among access points 110 and electronic device 112 in WLAN 100 in accordance with some embodiments, access point 110-1 may generate and may distribute, based on the optional topography information, secondary PMKs to RF-neighbor access points of access point 110-1 (e.g., access points 110-2 through 110-7). As was the case with the PMK in the four-way handshake, electronic device 112 may independently derive the secondary PMKs. Note that a given secondary PMK is sometimes referred to as a PMKR1Name (thus, in FIG. 5 the secondary PMKs are indicated as PMKR1s 510), and that it may be generated or determined in accordance with IEEE 802.11r. When distributing the secondary PMKs, access point 110-1 may include information that indicates access point 110-1 is the master access point in WLAN 100 for electronic device 112. Alternatively, access point 110-1 may provide the information to server 114 or optional controller 116, where is may be subsequently accessed by the other access points. In some embodiments, however, the master identity is implicit to or is specified by the secondary PMKs, such as the PMKR1Names (which are derived from the PMKR0Name).

Note that each of the secondary PMKs may be unique (e.g., a given secondary PMK may be unique to a given access point and the electronic device) and the secondary PMKs may facilitate fast BSS transitions with electronic device 112 when a handover occurs without using the four-way handshake to establish secure communication with electronic device 112. In particular, the RF-neighbor access points that receive the secondary PMKs may be able to establish secure communication with electronic device 112 without using the four-way handshake, thereby eliminating a time delay of up to 40 ms. In addition, by using the secondary PMKs, the other access points may not need to obtain the PSK from server 114. In some embodiments, the fast BSS transitions are compatible with an IEEE 802.11r standard.

Figure 6:
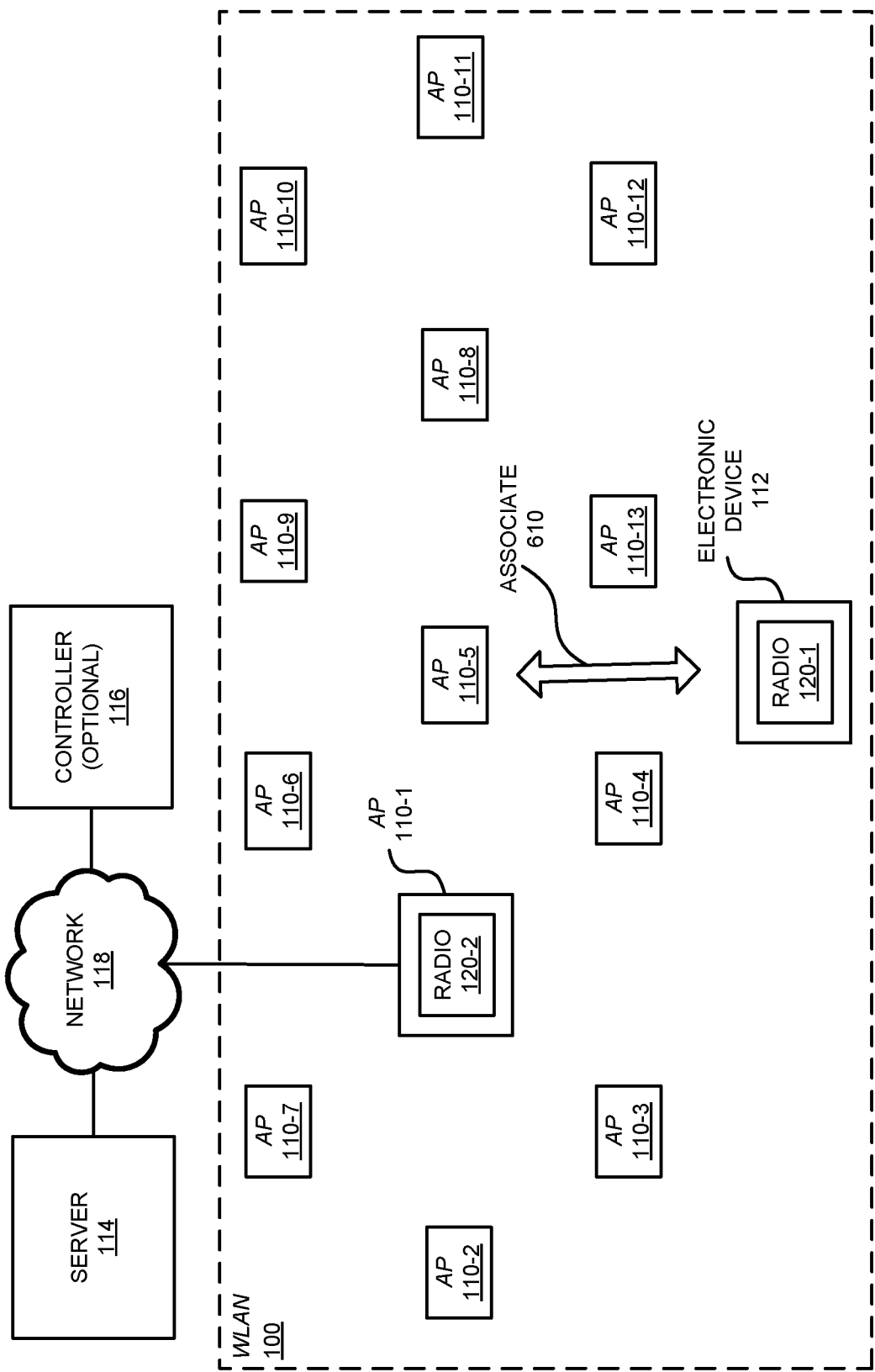
FIG. 6 is a drawing illustrating communication among the access points and the electronic device in the WLAN of FIG. 1 in accordance with an embodiment of the present disclosure.

Subsequently, as shown in FIG. 6, which presents a drawing illustrating communication among access points 110 and electronic device 112 in WLAN 100 in accordance with some embodiments, electronic device 112 may associate 610 with one of the other access points (such as access point 110-5) that is in the RF-neighbor access points of access point 110-1. As noted previously, the secondary PMK may allow access point 110-5 to have a fast BSS transition with electronic device 112 when a handover occurs without using the four-way handshake to establish secure communication with electronic device 112. In particular, electronic device 112 may: perform active or passive scanning for access point 110-5; exchange authentication messages with access point 110-5; and exchange association messages with access point 110-5 to establish a connection. The pre-distributed secondary PMK may eliminate the need for the PMK negotiation with server 114 (or optional controller 116). At this point, access point 110-5 and electronic device 112 have a connection, but may not be allowed to exchange data frames because they have not established a key. The PTK (as well as quality of service or QoS admission control to establish QoS streams) may be established between access point 110-5 and electronic device 112 without four-way handshake 1028 by including the information used to determine the PTK (such as the access-point and the electronic-device nonces), as well as the QoS admission control exchanges, in the authentication and the association messages.

Note that by establishing secure communication without using the four-way handshake, the communication may eliminate a time delay of up to 40 ms during the handover. Thus, the time needed to establish secure communication between electronic device 112 and access point 110-5 may be reduced from 100 ms to 60 ms.

Figure 7:
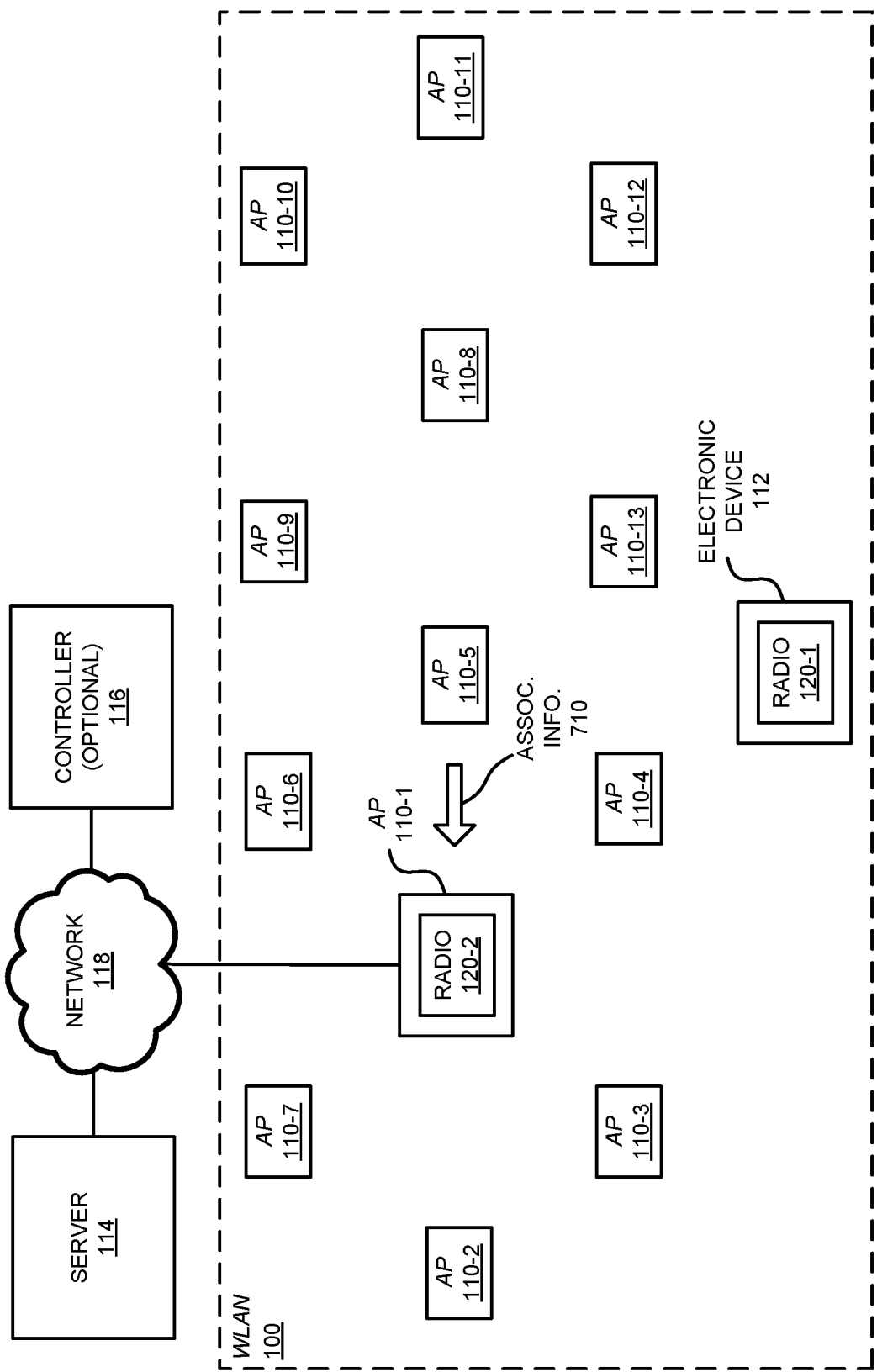
FIG. 7 is a drawing illustrating communication among the access points and the electronic device in the WLAN of FIG. 1 in accordance with an embodiment of the present disclosure.

As shown in FIG. 7, which presents a drawing illustrating communication among access points 110 and electronic device 112 in WLAN 100 in accordance with some embodiments, access point 110-5 may provide association information 710 to access point 110-1 that indicates that electronic device 112 has associated with access point 110-5 based on the previously received information that indicates that access point 110-1 is the master access point in WLAN 100 for electronic device 112.

Figure 8:
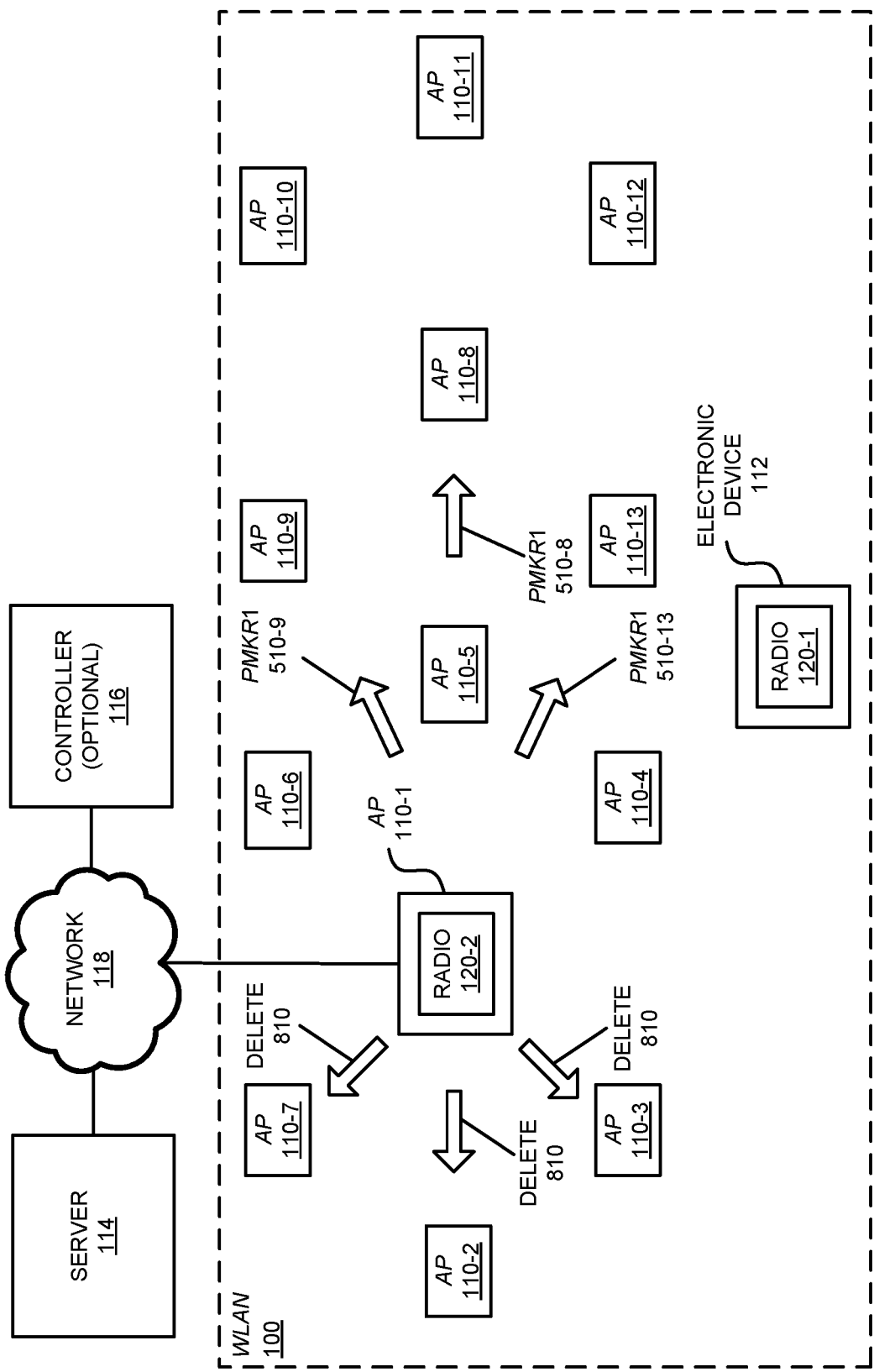
FIG. 8 is a drawing illustrating communication among the access points and the electronic device in the WLAN of FIG. 1 in accordance with an embodiment of the present disclosure.

In response, as shown in FIG. 8, which presents a drawing illustrating communication among access points 110 and electronic device 112 in WLAN 100 in accordance with some embodiments, access point 110-1 may provide instructions to delete 810 the secondary PMKs at the RF-neighbor access points of access point 110-1 that are not RF-neighbor access points of access point 110-5 (e.g., access points 110-2, access points 110-3 and access points 110-7), and may generate and provide additional secondary PMKs (PMKR1s 510) to RF-neighbor access points of access point 110-5 that do not already have additional secondary PMKs (e.g., access points 110-8, 110-9 and 110-13).

Figure 9:
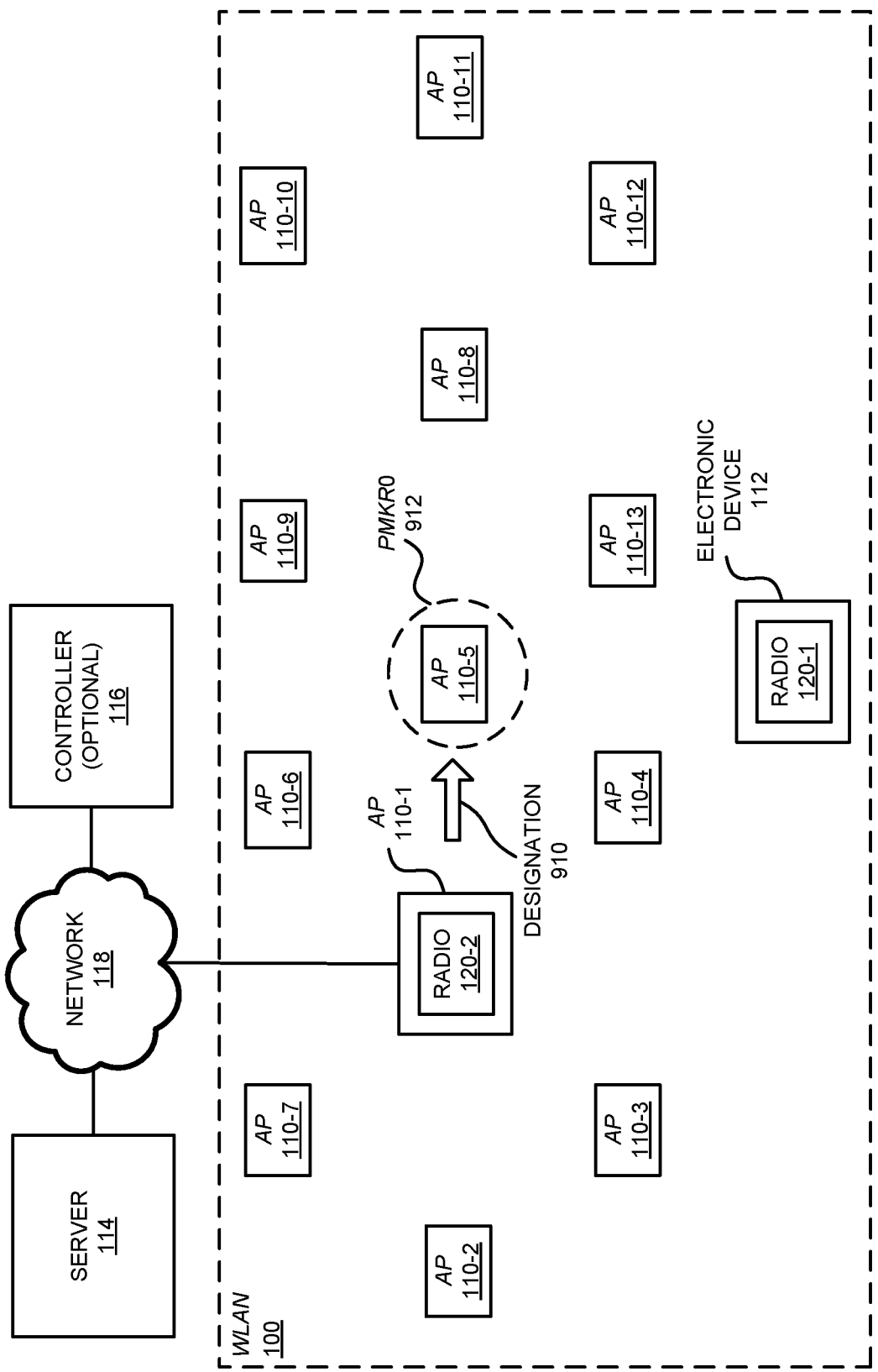
FIG. 9 is a drawing illustrating communication among the access points and the electronic device in the WLAN of FIG. 1 in accordance with an embodiment of the present disclosure.

In some embodiments, access point 110-1 performs load balancing in WLAN 100. This is shown in FIG. 9, which presents a drawing illustrating communication among access points 110 and electronic device 112 in WLAN 100 in accordance with some embodiments. In particular, when there is high loading of access point 110-1 (such as when the number of electronic devices associated with access point 110-1 exceeds a threshold value, e.g., 10, 50, 100, etc.) and the loading of access point 110-5 is not high (such as when the number of electronic devices associated with access point 110-5 is less than the threshold value), then after receiving the association information access point 110-1 may designate 910 access point 110-5 as the master access point in WLAN 100 for electronic device 112 (i.e., PMKR0 912). Subsequently, when electronic device 112 roams in WLAN 100, access point 110-5 may perform the functions of the master, such as generating and distributing the secondary PMKs, providing instructions to delete secondary PMKs, etc.

Figure 10:
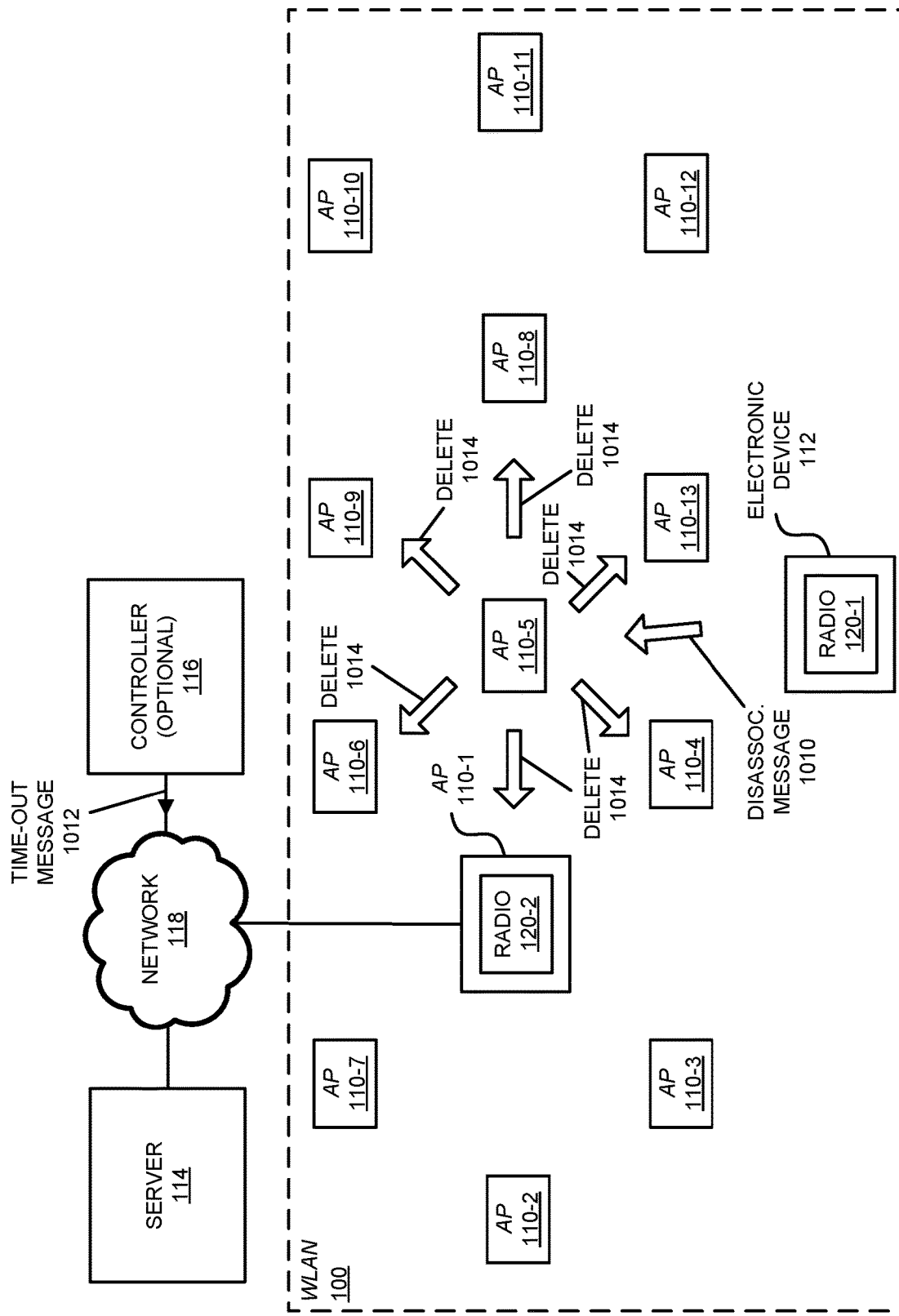
FIG. 10 is a drawing illustrating communication among the access points and the electronic device in the WLAN of FIG. 1 in accordance with an embodiment of the present disclosure.

Alternatively or additionally, as shown in FIG. 10, which presents a drawing illustrating communication among access points 110 and electronic device 112 in WLAN 100 in accordance with some embodiments, when access point 110-5 (which is the current master) receives a disassociate message 1010 from electronic device 112 or a time-out message 1012 for the connection from optional controller 116, access point 110-1 may delete the PMK and may provide instructions to delete 1014 the secondary PMKs at the RF-neighbor access points of access point 110-5.

Note that the messages exchanged among access points 110 and electronic device 112 during the communication technique may have a type length value (TLV) format.

In an exemplary embodiment, during an initial mobility domain association an initial access point (which is also an authenticator) can act as a master or R0KH. It may derive the PMKR1 for itself and for each of its neighboring access points that an electronic device could roam to, and distributes the PMKR1 using secure access point-to-access point communications.

For example, two access points (AP2 and AP3) may be in the same mobility domain as another access point (AP1) and may also be the RF neighbors of AP1. Moreover, AP2 and AP4 may be RF neighbors and may also be in the same mobility domain. Consequently, an electronic device may roam and connect to any of these access points. If the electronic device associates to AP1, the authenticator residing in AP1 may derive the PMKR0 using the MSK/PSK, the service set identifier (SSID), the mobile domain identifier (MDID), the R0 key handler identification (R0KHID) and the S0 key handler identification (S0KHID). This authenticator also derives the PMKR1 for each of the neighboring access points (which may also act as a R1 key holders) using PMKR0, R1KHID and the S0KHID. Then, AP1 may distribute these keys (PMKR1), R0KHID, S0KHID to the neighboring R1KHs.

Next, if the electronic device transitions to any other neighboring access point (such as AP2), it may be the responsibility of this access point to indicate the R0KH that the electronic device was recently connected to. It may also provide the neighborhood information. In particular, after the electronic device successfully associates to AP2, AP2 may provide the neighbor or association information to AP1. R0KH may then look at the neighbor information of AP2 and may create and plumb the PMKR1 for each of the neighboring access points.

The R0KH may also have information about all the R1KH of the electronic device. This may be required if the key gets deleted by a network-attached-storage server. In this case, the R0KH may indicate to all the R1KHs to delete the PMKR1 keys.

Note that when the electronic device transitions to any other access point, that access point may indicate or inform the original R0KH about its neighboring access points. The R0KH may also have a list of all the R1KH, and it may start pruning the PMKR1 and sending out a PMKR1-ageout or delete message to all the R1KH access points, which are no longer neighbors of the current access point (AP2) that the electronic device is associated with.

Furthermore, as soon as the electronic device is fast-transfer associated to AP2, AP2 may send a message to the R0KH (AP1) that also includes a list of neighboring access points of AP2. Then, AP1 may create or generate PMKR1 for the neighboring access points that are not already R1KH and may also send a PMKR1-ageout or delete message to all the R1KHs that are not the neighbors of AP2.

Additionally, note that venues often constrain user ingress areas (e.g., the building doorway, the exits, the building lobby/foyer, a passenger-train loading platform, a airport jetway, etc.). Likewise, there can be constrained walkways internal to a venue (e.g., at airport security, at elevator doorway, etc.). There is often one access point, serving a venue's ingress or walkway, that electronic devices associate with. This access point typically becomes the R0KH for each electronic device that joins the mobility domain. In order to distribute the R0KH's load, once the R0KH identifies that the electronic device has transitioned out to another access point, it may obtain or get information about the random access-points present in the mobility domain from a controller and transfers the PMKR0 data for the electronic device to that access point and may keep a small amount of information about the new access point, which may now act as the R0KH for this electronic device.

In some embodiments, after the electronic device fast-transfer associates to AP2, AP1 may get an Internet Protocol address of a random access point present in the mobility domain from the controller. For example, if AP3 is the random access point, AP1 may moves the PMKR0 data for the electronic device to AP3, and AP1 may keep a small database of the current R0KH for the electronic device.

Figure 11:
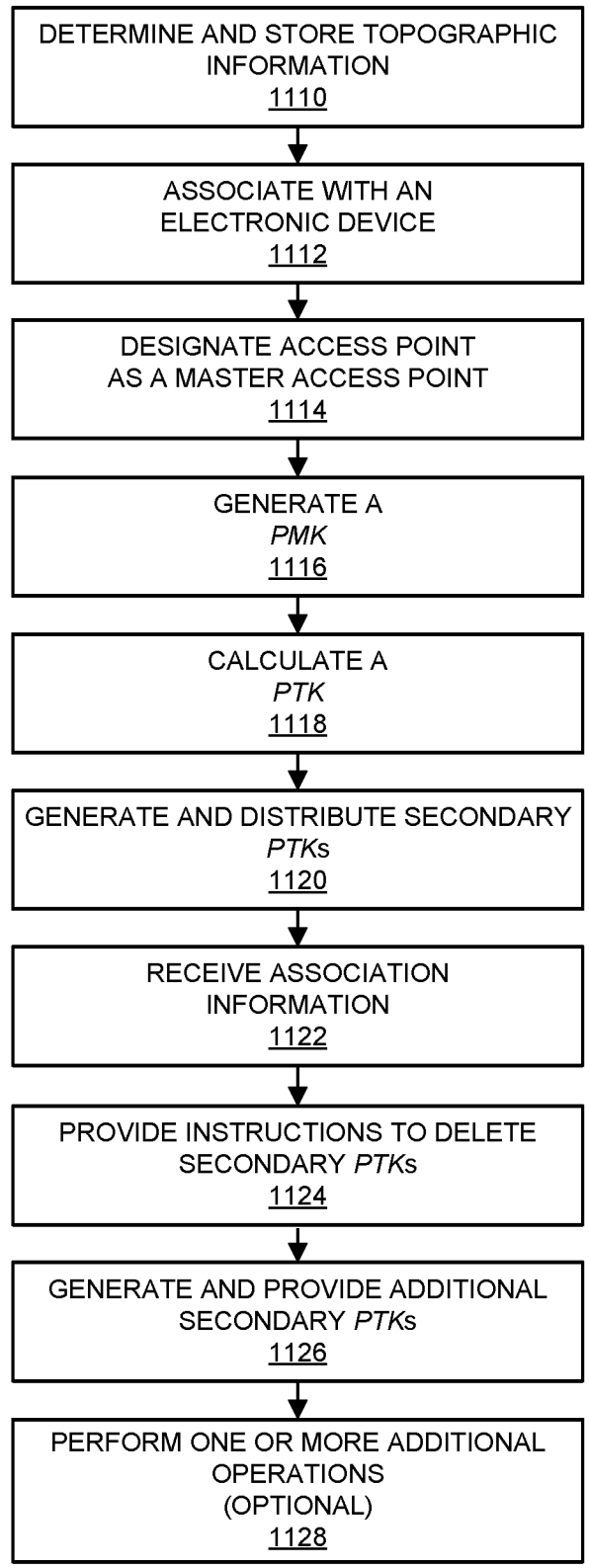
FIG. 11 is a flow diagram illustrating a method for facilitating fast handoffs in a WLAN that includes other access points in accordance with an embodiment of the present disclosure.

We now describe embodiments of the method. FIG. 11 presents a flow diagram illustrating a method 1100 for facilitating fast handoffs in a WLAN that includes other access points in accordance with some embodiments, which may be performed by an access point, such as access point 110-1 in FIG. 1. During operation, the access point optionally determines and stores topography information (operation 1110) specifying RF-neighbor access points for the access point and other access points in the WLAN based on the communication between the access point and the other access points. Then, when the access point associates with an electronic device (operation 1112), the access point is designated as a master access point (operation 1114) in the WLAN for the electronic device. For example, the access point may designate itself as the master if none of the other access points is already the master. Alternatively, a controller of the access point and the other access points may designate the access point as the master.

Based on a PSK (and, more generally, a shared secret), the access point generates a PMK (operation 1116) associated with the access point and the electronic device. For example, the PSK may include Extensible Authentication Protocol (EAP) parameters, and the access point may obtain the EAP parameters from a server (such as a RADIUS server or a controller), when authenticating the electronic device in the WLAN. Moreover, the PMK may be generated using a secure hashing function based on the PSK, such as HMAC-SHA256.

Furthermore, using a four-way handshake with the electronic device, the access point calculates a PTK (operation 1118) to enable secure communication with the electronic device. In particular, the four-way handshake may be compatible with an IEEE 802.11i standard.

Next, the access point generates and distributes secondary PMKs (operation 1120) to RF-neighbor access points of the access point based on the optional topography information, where each of the secondary PMKs are unique (e.g., a given secondary PMK may be unique to a given access point and the electronic device) and the secondary PMKs facilitate fast BSS transitions with the electronic device when a handover occurs without using the four-way handshake to establish secure communication with the electronic device. In particular, the RF-neighbor access points that receive the secondary PMKs may be able to establish secure communication with the electronic device without using the four-way handshake. Note that the RF-neighbor access points of the access point may be nearest RF neighbors of the access point. In some embodiments, the fast BSS transitions are compatible with an IEEE 802.11r standard. Additionally, when distributing the secondary PMKs (operation 1120), the access point may include information that indicates the access point is the master access point in the WLAN for the electronic device.

Subsequently, the access point receives association information (operation 1122) from a second access point in the RF-neighbor access points of the access point that indicates that the electronic device has associated with the second access point. For example, based on the distributed information that indicates the access point is the master access point, the second access point may know to contact the access point as the 'master' for the electronic device when the electronic device associates with the second access point.

In response, the access point provides instructions to delete the secondary PMKs (operation 1124) at the RF-neighbor access points of the access point, and may generate and provide additional secondary PMKs (operation 1126) to RF-neighbor access points of the second access point. Note that the RF-neighbor access points of the second access point may be nearest RF neighbors of the second access point.

In some embodiments, the access point optionally performs one or more additional operations (operation 1128). For example, the access point may perform load balancing in the WLAN. In particular, when there is high loading of the access point (such as when the number of electronic devices associated with the access point exceeds a threshold value, e.g., 10, 50, 100, etc.) and the loading of the second access point is not high (such as when the number of electronic devices associated with the second access point is less than the threshold value), then after receiving the association information (operation 1124) the access point may designate the second access point as the master access point in the WLAN for the electronic device.

Alternatively or additionally, when the access point receives a disassociate message from the electronic device or a time-out message from the controller, the access point may delete the PMK and may provide instructions to delete the secondary PMKs at the RF-neighbor access points of the access point.

In some embodiments of method 1100, there may be additional or fewer operations. Furthermore, the order of the operations may be changed, and/or two or more operations may be combined into a single operation.

Figure 12:
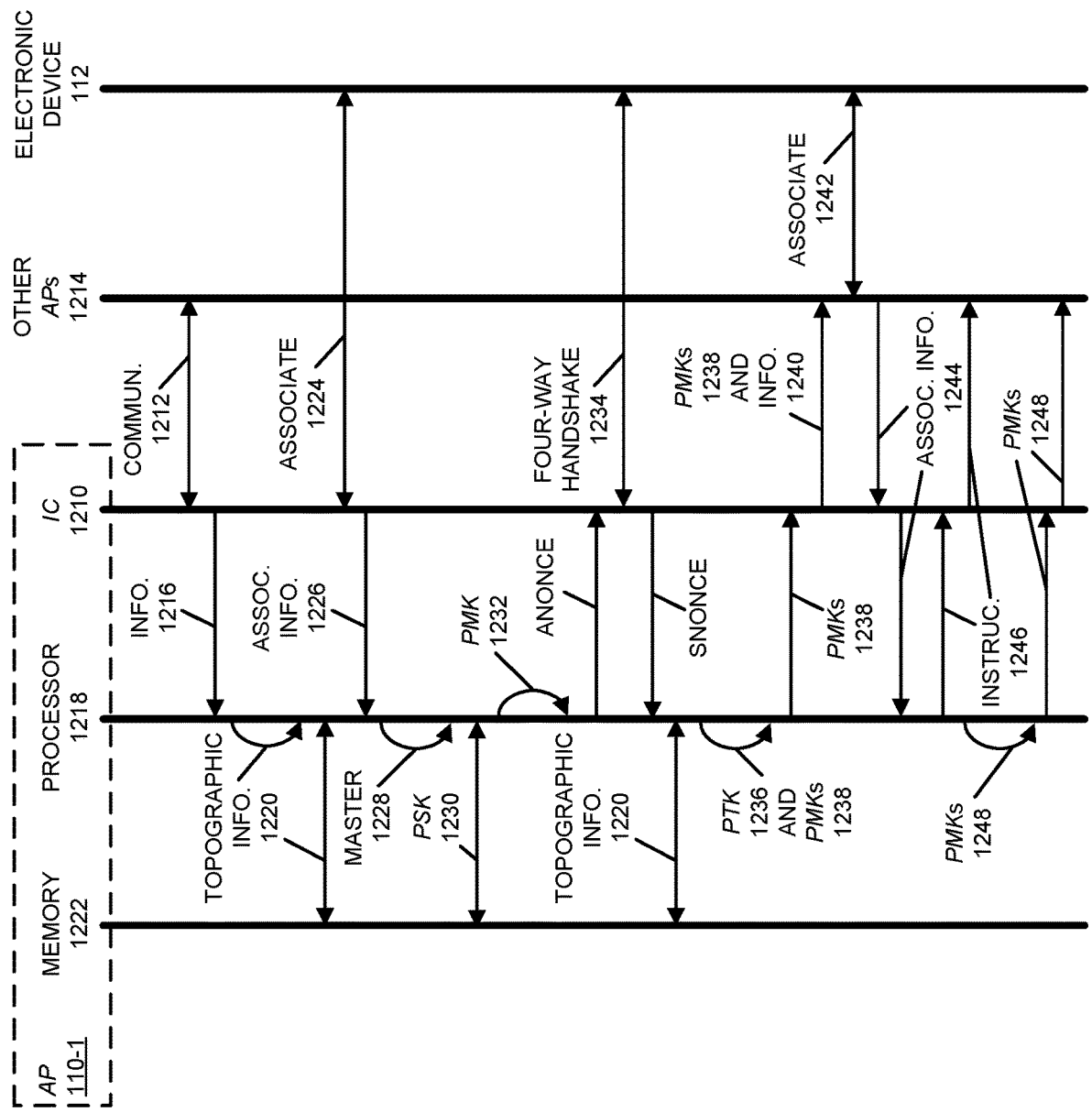
FIG. 12 is a drawing illustrating communication among the electronic devices in FIGS. 1-3 and 5-10 in accordance with an embodiment of the present disclosure.

Embodiments of the communication technique are further illustrated in FIG. 12, which presents a drawing illustrating communication among electronic device 112 and access points 110 in accordance with some embodiments. In particular, an interface circuit (IC) 1210 in access point 110-1 may communicate 1212 with other access points 1214 in the WLAN, and based information 1216 determined during this communication (such as reported RSSI values), processor 1218 may optionally determine, and then store in memory 1222, topography information 1220 specifying RF-neighbor access points for access point 110-1 and the other access points 1214.

Then, when interface circuit 1210 associates 1224 with electronic device 112 and provides association information 1226 processor 1218, processor 1218 may designate access point 110-1 as a master 1228 access point in the WLAN for electronic device 112. Moreover, based on the PSK 1230 (which may be requested and received from a server or a controller), processor 1218 may generate a PMK 1232 associated with access point 110-1 and electronic device 112 (e.g., PMK 1232 may be uniquely associated with access point 110-1 and electronic device 112).

Furthermore, as was described previously in FIG. 4, using a four-way handshake 1234 between interface circuit 1210 and electronic device 112, processor 1218 may calculate a PTK 1236 to enable secure communication with electronic device 112.

Next, processor 1218 may generate and interface circuit 1210 may distribute secondary PMKs 1238 to RF-neighbor access points of access point 110-1 in the other access points 1214 based on optional topography information 1220. Additionally, when distributing secondary PMKs 1238, interface circuit 1210 may include information 1240 that indicates access point 110-1 is the master access point in the WLAN for electronic device 112.

Subsequently, electronic device 112 may associate 1242 with one of the other access points 1214 (such as the second access point) that is in the RF-neighbor access points of access point 110-1. Note that the secondary PMK may allow the second access point to have a fast BSS transition with electronic device 112 when a handover occurs without using the four-way handshake to establish secure communication with electronic device 112. In particular, electronic device 112 may: perform active or passive scanning for the second access point; exchange authentication messages with the second access point; and exchange association messages with the second access point to establish a connection. The pre-distributed secondary PMK may eliminate the need for the PMK negotiation with the server or the controller. At this point, the second access point and electronic device 112 have a connection, but may not be allowed to exchange data frames because they have not established a key. The PTK (as well as quality of service or QoS admission control to establish QoS streams) may be established between the second access point and electronic device 112 without four-way handshake 1234 by including the PTK and the QoS admission control exchanges in the authentication and the association messages.

Furthermore, based on information 1240, the second access point may provide association information 1244 to interface circuit 1210 that indicates that electronic device 112 has associated with it. In response, processor 1218, via interface circuit 1210, may provide instructions 1246 to delete secondary PMKs 1238 at the RF-neighbor access points of access point 110-1, and may generate and may provide additional secondary PMKs 1248 to RF-neighbor access points of the second access point.

While the preceding examples illustrated the communication technique with particular security protocols and encryption techniques and keys, more generally the communication technique may be used with a wide variety of security protocols and encryption techniques and keys.

We now describe embodiments of an electronic device, which may perform at least some of the operations in the communication technique. FIG. 13 presents a block diagram illustrating an electronic device 1300 in accordance with some embodiments, such as one of access points 110, electronic device 112, server 114 or optional controller 116. This electronic device includes processing subsystem 1310, memory subsystem 1312, and networking subsystem 1314. Processing subsystem 1310 includes one or more devices configured to perform computational operations. For example, processing subsystem 1310 can include one or more microprocessors, ASICs, microcontrollers, programmable-logic devices, and/or one or more digital signal processors (DSPs).

Memory subsystem 1312 includes one or more devices for storing data and/or instructions for processing subsystem 1310 and networking subsystem 1314. For example, memory subsystem 1312 can include dynamic random access memory (DRAM), static random access memory (SRAM), and/or other types of memory. In some embodiments, instructions for processing subsystem 1310 in memory subsystem 1312 include: one or more program modules or sets of instructions (such as program module 1322 or operating system 1324), which may be executed by processing subsystem 1310. Note that the one or more computer programs may constitute a computer-program mechanism. Moreover, instructions in the various modules in memory subsystem 1312 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1310.

In addition, memory subsystem 1312 can include mechanisms for controlling access to the memory. In some embodiments, memory subsystem 1312 includes a memory hierarchy that comprises one or more caches coupled to a memory in electronic device 1300. In some of these embodiments, one or more of the caches is located in processing subsystem 1310.

In some embodiments, memory subsystem 1312 is coupled to one or more high-capacity mass-storage devices (not shown). For example, memory subsystem 1312 can be coupled to a magnetic or optical drive, a solid-state drive, or another type of mass-storage device. In these embodiments, memory subsystem 1312 can be used by electronic device 1300 as fast-access storage for often-used data, while the mass-storage device is used to store less frequently used data.

Networking subsystem 1314 includes one or more devices configured to couple to and communicate on a wired and/or wireless network (i.e., to perform network operations), including: control logic 1316, an interface circuit 1318 and one or more antennas 1320 (or antenna elements). (While FIG. 13 includes one or more antennas 1320, in some embodiments electronic device 1300 includes one or more nodes, such as nodes 1308, e.g., a pad, which can be coupled to the one or more antennas 1320. Thus, electronic device 1300 may or may not include the one or more antennas 1320.) For example, networking subsystem 1314 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 1314 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1300 may use the mechanisms in networking subsystem 1314 for performing simple wireless communication between the electronic devices, e.g., transmitting advertising or beacon frames and/or scanning for advertising frames transmitted by other electronic devices as described previously.

Within electronic device 1300, processing subsystem 1310, memory subsystem 1312, and networking subsystem 1314 are coupled together using bus 1328. Bus 1328 may include an electrical, optical, and/or electro-optical connection that the subsystems can use to communicate commands and data among one another. Although only one bus 1328 is shown for clarity, different embodiments can include a different number or configuration of electrical, optical, and/or electro-optical connections among the subsystems.

In some embodiments, electronic device 1300 includes a display subsystem 1326 for displaying information on a display, which may include a display driver and the display, such as a liquid-crystal display, a multi-touch touchscreen, etc.

Electronic device 1300 can be (or can be included in) any electronic device with at least one network interface. For example, electronic device 1300 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, an access point, a controller, test equipment, and/or another electronic device.

Although specific components are used to describe electronic device 1300, in alternative embodiments, different components and/or subsystems may be present in electronic device 1300. For example, electronic device 1300 may include one or more additional processing subsystems, memory subsystems, networking subsystems, and/or display subsystems. Additionally, one or more of the subsystems may not be present in electronic device 1300. Moreover, in some embodiments, electronic device 1300 may include one or more additional subsystems that are not shown in FIG. 13. Also, although separate subsystems are shown in FIG. 13, in some embodiments some or all of a given subsystem or component can be integrated into one or more of the other subsystems or component(s) in electronic device 1300. For example, in some embodiments program module 1322 is included in operating system 1324 and/or control logic 1316 is included in interface circuit 1318.

Moreover, the circuits and components in electronic device 1300 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1314. The integrated circuit may include hardware and/or software mechanisms that are used for transmitting wireless signals from electronic device 1300 and receiving signals at electronic device 1300 from other electronic devices. Aside from the mechanisms herein described, radios are generally known in the art and hence are not described in detail. In general, networking subsystem 1314 and/or the integrated circuit can include any number of radios. Note that the radios in multiple-radio embodiments function in a similar way to the described single-radio embodiments.

In some embodiments, networking subsystem 1314 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 1322, operating system 1324 (such as a driver for interface circuit 1318) or in firmware in interface circuit 1318. Alternatively or additionally, at least some of the operations in the communication technique may be implemented in a physical layer, such as hardware in interface circuit 1318.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An access point, comprising:
    an interface circuit that is configured to communicate with an electronic device and with other access points in a wireless local area network (WLAN), wherein the access point is configured to:
    determine and store topography information specifying radio-frequency (RF)-neighbor access points for the access point and the other access points based on the communication between the access point and the other access points;
    when the access point associates with the electronic device, designate the access point as a master access point in the WLAN for the electronic device;
    generate, based on a pre-shared key (PSK), a pairwise master key (PMK) associated with the access point and the electronic device;
    using a four-way handshake with the electronic device, calculate a pairwise transient key (PTK) to enable secure communication with the electronic device;
    generate and distribute secondary PMKs to RF-neighbor access points of the access point based on the topography information, wherein each of the secondary PMKs are unique, and wherein the secondary PMKs facilitate fast basic service set (BSS) transitions with the electronic device when a handover occurs without using the four-way handshake to establish secure communication with the electronic device;
    receive association information from a second access point in the RE-neighbor access points of the access point that indicates that the electronic device has associated with the second access point; and
    in response to the association information:
        provide instructions to delete the secondary PMKs at the RF-neighbor access points of the access point; and
        provide additional secondary PMKs to RE-neighbor access points of the second access point.

2. The access point of claim 1, wherein the communication between the access point and the other access points comprise wired communication, wireless communication or both.

3. The access point of claim 1, wherein the PSK comprises Extensible Authentication Protocol (EAP) parameters; and
    wherein the access point obtains the EAP parameters from a server when authenticating the electronic device in the WLAN.

4. The access point of claim 1, wherein the PMK is generated using a secure hashing function based on the PSK.

5. The access point of claim 1, wherein the four-way handshake is compatible with an IEEE 802.11i standard and the fast basic service set (BSS) transitions is compatible with an IEEE 802.11r standard.

6. The access point of claim 1, wherein the RF-neighbor access points of a given access point, which is one of the other access points and the access point, are nearest RF neighbors of the given access point.

7. The access point of claim 1, wherein, when distributing the secondary PMKs, the access point includes information that indicates the access point is the master access point in the WLAN for the electronic device.

8. The access point of claim 1, wherein, when a number of electronic devices associated with the access point exceeds a threshold value and a number of electronic devices associated with the second access point is less than the threshold value, the access point is configured to designate, after receiving the association information, the second access point as the master access point in the WLAN for the electronic device.

9. The access point of claim 1, wherein, when the access point receives one of a disassociate message from the electronic device or a time-out message from the controller, the access point is configured to delete the PMK and is configured to provide instructions to delete the secondary PMKs at the RF-neighbor access points of the access point.

10. The access point of claim 1, wherein the access point further comprises:
    a processor, coupled to the interface circuit and memory, configured to execute program instructions; and
    the memory, coupled to the processor, configured to store the program instructions, wherein the program instructions comprise instructions for at least some of the operations performed by the access point.

11. A method for facilitating fast handoffs in a wireless local area network (WLAN) that comprises an access point and other access points, wherein the method comprises:
    determining and storing topography information specifying radio-frequency (RF)-neighbor access points for the access point and the other access points based on the communication between the access point and the other access points;
    when the access point associates with an electronic device, designating the access point as a master access point in the WLAN for the electronic device;
    generating, based on a pre-shared key (PSK), a pairwise master key (PMK) associated with the access point and the electronic device;
    using a four-way handshake with the electronic device, calculating a pairwise transient key (PTK) to enable secure communication with the electronic device;
    generating and distributing secondary PMKs to RE-neighbor access points of the access point based on the topography information, wherein each of the secondary PMKs are unique, and wherein the secondary PMKs facilitate fast basic service set (BSS) transitions with the electronic device when a handover occurs without using the four-way handshake to establish secure communication with the electronic device;

receiving association information from a second access point in the RE-neighbor access points of the access point that indicates that the electronic device has associated with the second access point; and in response to the association information:
provicing instructions to delete the secondary PMKs at the RE-neighbor access points of the access point; and providing additional secondary PMKs to RF-neighbor access points of the second access point.

12. The method of claim 11, wherein the communication between the access point and the other access points comprise wired communication, wireless communication or both.

13. The method of claim 11, wherein the PSK includes Extensible Authentication Protocol (EAP) parameters; and
wherein the method further comprises obtaining the EAP parameters from a server when authenticating the electronic device in the WLAN.

14. The method of claim 11, wherein the PMK is generated using a secure hashing function based on the PSK.

15. The method of claim 11, wherein the four-way handshake is compatible with an IEEE 802.11i standard and the fast basic service set (BSS) transitions is compatible with an IEEE 802.11r standard.

16. The method of claim 11, wherein the RF-neighbor access points of a given access point, which is one of the other access points and the access point, are nearest RF neighbors of the given access point.

17. The method of claim 11, wherein, when distributing the secondary PMKs, the access point includes information that indicates the access point is the master access point in the WLAN for the electronic device.

18. The method of claim 11, wherein, when a number of electronic devices associated with the access point exceeds a threshold value and a number of electronic devices associated with the second access point is less than the threshold value, the method further comprises designating, after receiving the association information, the second access point as the master access point in the WLAN for the electronic device.

19. The method of claim 11, wherein, when the access point receives one of a disassociate message from the electronic device and a time-out message from the controller, the method further comprises deleting the PMK and providing instructions to delete the secondary PMKs at the RE-neighbor access points of the access point.

20. A non-transitory computer-readable storage medium for use in conjunction with an access point, the computer-readable storage medium storing program instructions, wherein, when executed by the access point, the program instructions cause the access point to perform operations that facilitate fast handoffs in a wireless local area network (WLAN) that comprises an access point and other access points, the operations comprising:

determining and storing topography information specifying radio-frequency (RF)-neighbor access points for the access point and the other access points based on the communication between the access point and the other access points;

designating, when the access point associates with an electronic device, the access point as a master access point in the WLAN for the electronic device;

generating, based on a pre-shared key (PSK), a pairwise master key (PMK) associated with the access point and the electronic device;

calculating, using a four-way handshake with the electronic device, a pairwise transient key (PTK) to enable secure communication with the electronic device;

generating and distributing secondary PMKs to RF-neighbor access points of the access point based on the topography information, wherein each of the secondary PMKs are unique, and wherein the secondary PMKs facilitate fast basic service set (BSS) transitions with the electronic device when a handover occurs without using the four-way handshake to establish secure communication with the electronic device;

receiving association information from a second access point in the RF-neighbor access points of the access point that indicates that the electronic device has associated with the second access point; and in response to the association information:
providing instructions to delete the secondary PMKs at the RF-neighbor access points of the access point; and providing additional secondary PMKs to RE-neighbor access points of the second access point.

* * * * *

UNITED STATES PATENT AND TRADEMARK OFFICE
CERTIFICATE OF CORRECTION

PATENT NO. : 11,310,724 B2  
APPLICATION NO. : 16/090583  
DATED : April 19, 2022  
INVENTOR(S) : Pandey et al.

Page 1 of 1

It is certified that error appears in the above-identified patent and that said Letters Patent is hereby corrected as shown below:

In the Claims

Column 17, Line 59, Claim 1: Please correct "RE" to read -- RF --

Column 17, Line 66, Claim 1: Please correct "RE" to read -- RF --

Column 18, Line 65, Claim 11: Please correct "RE" to read -- RF --

Column 19, Line 6, Claim 11: Please correct "RE" to read -- RF --

Column 19, Line 11, Claim 11: Please correct "RE" to read -- RF --

Column 20, Line 4, Claim 19: Please correct "RE" to read -- RF --

Column 20, Line 45, Claim 20: Please correct "RE" to read -- RF --

Signed and Sealed this  
Thirteenth Day of September, 2022

Katherine Kelly Vidal  
*Director of the United States Patent and Trademark Office*